US011023587B2

United States Patent
Oster et al.

(10) Patent No.: US 11,023,587 B2
(45) Date of Patent: Jun. 1, 2021

(54) EXTERNAL TRUST CACHE

(71) Applicant: Apple Inc., Cupertino, CA (US)

(72) Inventors: Julien Oster, San Francisco, CA (US); Eric S. Harmon, San Francisco, CA (US); Mitchell K. Allison, Sunnyvale, CA (US); Pierre-Olivier J. Martel, Mountain View, CA (US); Damien P. Sorresso, San Francisco, CA (US); Dallas B. De Atley, San Francisco, CA (US); Ryan P. Nielsen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 16/147,712

(22) Filed: Sep. 29, 2018

(65) Prior Publication Data

US 2019/0370469 A1    Dec. 5, 2019

Related U.S. Application Data

(60) Provisional application No. 62/679,957, filed on Jun. 3, 2018.

(51) Int. Cl.
*G06F 9/00*     (2006.01)
*G06F 15/177*   (2006.01)
*G06F 21/57*    (2013.01)
*G06F 12/14*    (2006.01)
*G06F 12/0875*  (2016.01)

(52) U.S. Cl.
CPC ........ *G06F 21/575* (2013.01); *G06F 12/0875* (2013.01); *G06F 12/1416* (2013.01)

(58) Field of Classification Search
CPC ................................................... G06F 21/575
See application file for complete search history.

(56) References Cited

U.S. PATENT DOCUMENTS

| | | | |
|---|---|---|---|
| 6,185,678 B1 | 2/2001 | Arbaught et al. | |
| 8,429,423 B1 | 4/2013 | King et al. | |
| 9,075,995 B2 | 7/2015 | England et al. | |
| 9,195,831 B1 * | 11/2015 | Condra | G06F 21/575 |
| 9,256,742 B2 * | 2/2016 | Raghuram | G06F 21/57 |
| 2008/0229114 A1 * | 9/2008 | Okabe | G06F 21/57 |
| | | | 713/189 |

(Continued)

OTHER PUBLICATIONS https://media.blackhat.com/bh-us-11/DaiZovi/BH_US_11_DaiZovi_iOS_Security_WP.pdf; Apple iOS 4 Security Evaluation, Dino A. Dai Zovi, Principal, Trail of Bits LLC, Version: 1.0, 32 pages, Jun. 29, 2011.

*Primary Examiner* — Mohammed H Rehman
(74) *Attorney, Agent, or Firm* — Kowert, Hood, Munyon, Rankin & Goetzel, P.C.; Lawrence J. Merkel

(57) ABSTRACT

In an embodiment, a system supports an external trust cache. That is, the trust cache is separate from the kernel image on the non-volatile storage in the system. During boot, the boot code may read the trust cache from the storage and write it to the working memory of the system (e.g. the Random Access Memory (RAM) forming the memory system in the system). The boot code may also validate the kernel image and write it to the memory system. The boot code may program a region register in the processor to define a region in the working memory that encompasses the kernel image and the trust cache, to protect the region from modification/tampering.

20 Claims, 4 Drawing Sheets

(56) References Cited

U.S. PATENT DOCUMENTS

| | | | |
|---|---|---|---|
| 2010/0031012 A1* | 2/2010 | Rotondo | G06F 21/00 |
| | | | 713/2 |
| 2010/0106976 A1* | 4/2010 | Aciicmez | G06F 21/64 |
| | | | 713/189 |
| 2011/0087872 A1* | 4/2011 | Shah | G06F 21/64 |
| | | | 713/2 |
| 2013/0198797 A1* | 8/2013 | Raghuram | G06F 21/57 |
| | | | 726/1 |
| 2013/0268614 A1* | 10/2013 | Bose | G06F 16/2255 |
| | | | 709/213 |
| 2014/0164789 A1* | 6/2014 | Kaplan | G06F 21/572 |
| | | | 713/191 |
| 2015/0127930 A1* | 5/2015 | Offenberg | G06F 21/572 |
| | | | 713/2 |
| 2017/0255775 A1 | 9/2017 | Sorresso | |
| 2017/0364685 A1 | 12/2017 | Shah et al. | |

* cited by examiner

EXTERNAL TRUST CACHE

This application claims benefit of priority to U.S. Provisional Patent Application Ser. No. 62/679,957, filed on Jun. 3, 2018. The above application is incorporated herein by reference in its entirety. To the extent that anything in above application conflicts with material expressly set forth in this application, the material expressly set forth herein controls.

BACKGROUND

Technical Field

Embodiments described herein are related to trust caches for operating systems, and more particularly for kernel-based operating systems.

Description of the Related Art

Operating systems generally control access to various resources in a computer system (e.g. memory, hardware devices such as peripherals, processor execution time etc.) so that application programs can execute successfully on the computer system and share the resources without conflict or interfering within each other. The operating system may include certain trusted code segments, or may be designed to operate with various trusted code segments that execute in user space. The trusted code segments may be provided on the system at the same time as the operating system, and/or may be known to be sourced from a trusted developer. In some cases, the trusted code segments may be sourced from the same entity that provides the operating system. Because these code segments are known to be "good" and reputable, the operating system may allow the trusted code segments more access to the resources and/or more control over the resources that are managed by the operating system than would be provided to untrusted code segments.

For security and proper system operation, a mechanism to ensure that the trusted code segments have not been nefariously modified since they were sourced by the trusted entity is needed. One mechanism that can be used is a trust cache. The trust cache stores hashes of trusted code segments. A hash value, or "hash" is a value generated by logically combining the bytes forming the code segment. The hash is large enough (in terms of number of bits) that the likelihood that the code segment can be changed without generated a different hash is statistically very small (or even non-existent). The definition of the logical combination of the bytes is referred to as the "hash function." When a trusted code segment is launched or called, the hash can be computed on the code segment and checked against the hash in the trust cache. If the hash matches, it is highly likely that the code segment is unmodified and can remain trusted.

The trust cache has been statically included as part of the operating system (or kernel) image and is compiled into the kernel as part of the image to be stored on a given system. Such a configuration limits the trust cache to a specific location in the kernel and a specific size. Additionally, the contents of the trust cache must be known at the time the kernel is built.

SUMMARY

In an embodiment, a system supports an external trust cache. That is, the trust cache is separate from the kernel image on the non-volatile storage in the system. During boot, the boot code may read the trust cache from the storage and write it to the working memory of the system (e.g. the Random Access Memory (RAM) forming the memory system in the system). The boot code may also validate the kernel image and write it to the memory system. The boot code may program a region register in the processor to define a region in the working memory that encompasses the kernel image and the trust cache, to protect the region from modification/tampering.

In an embodiment, storing the trust cache external to the kernel may provide flexibility in managing the trust cache. Rather than statically including the trust cache in the kernel when the kernel is compiled, the trust cache can be created at the time a given system is created. The trusted code segments included in the system may differ from implementation to implementation (e.g. depending on optional hardware included in a given implementation of the system) and thus the trust cache may be tailored to the given implementation. Since the trust cache is separate from the kernel image, the kernel need not be recompiled for each implementation merely to modify the trust cache. Additionally, the trust cache can be tailored to the size and contents needed for a given implementation.

In an embodiment, having external trust caches may permit multiple trust caches to be included in a system. For example, trust caches for debug code or other development code may be provided and may be loaded if the system is being debugged. Loading the additional trust caches at boot may ensure that trust may be verified for debug/development code that may be executed soon after boot, perhaps even before the file system is available.

BRIEF DESCRIPTION OF THE DRAWINGS

The following detailed description makes reference to the accompanying drawings, which are now briefly described.

Figure 1:
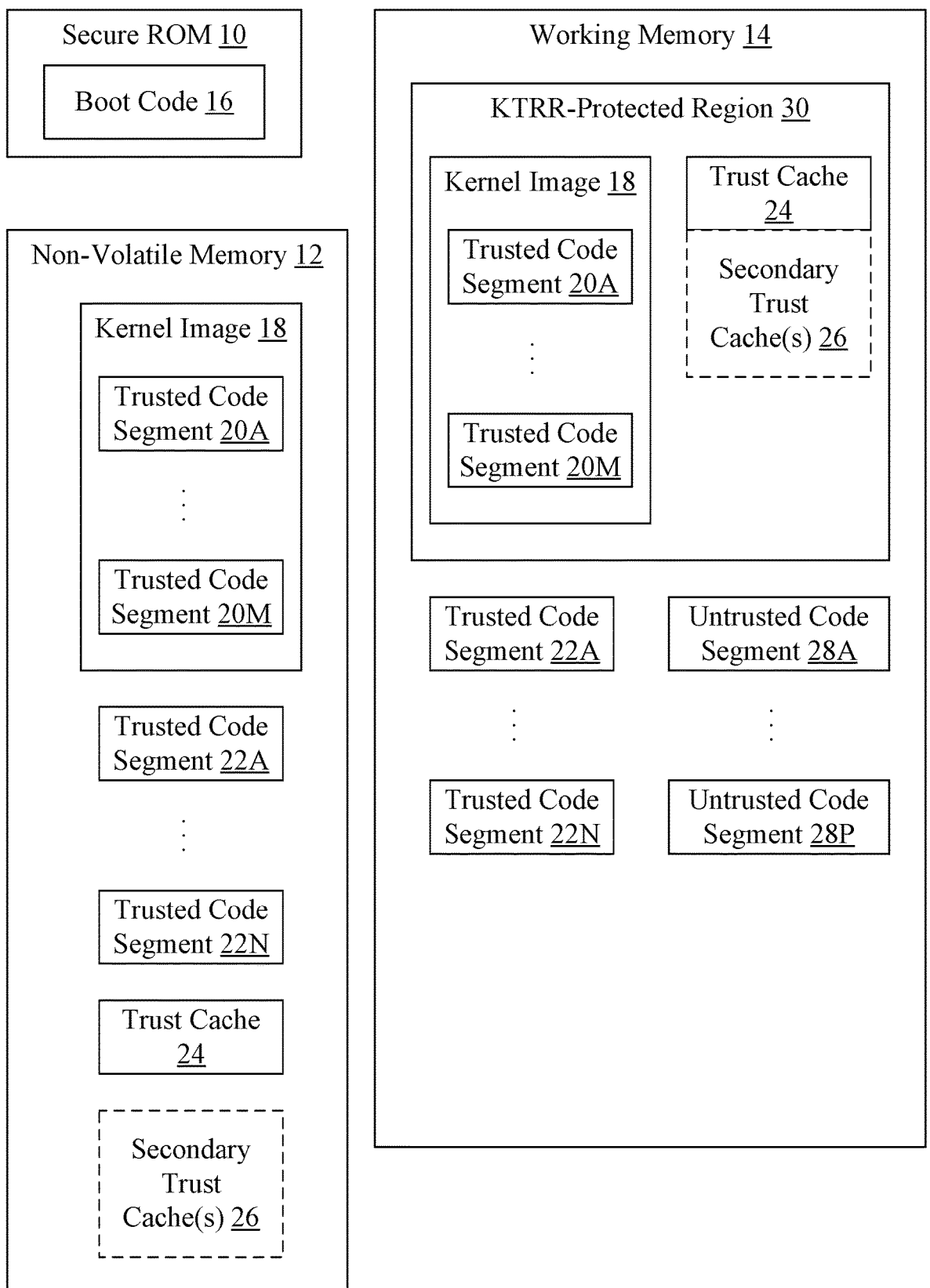
FIG. 1 is a block diagram of various components according to one embodiment.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of various components that may be included in a system is shown. In the embodiment of FIG. 1, the components may include a secure read-only memory (ROM) 10, a non-volatile memory 12, and a working memory 14. The secure ROM 10 may store boot code 16. The non-volatile memory 12 may store a kernel image 18 that includes one or more trusted code segments 20A-20M. Additionally, the non-volatile memory 12 may store trusted code segments 22A-22N, a trust cache 24, and in some embodiments, one or more secondary trust caches 26. The working memory 14 may store, during use, the kernel image 18 including the trusted code segments 20A-20M, the trust cache 24, and the secondary caches 26 if present and loaded by the boot code 16, trusted code segments 22A-22N, and untrusted code segments 28A-28P. The kernel image 18 and the trust caches 24 and 26 may be included in a kernel text region register (KTRR)-protected region 30 in the working memory 14.

Figure 4:
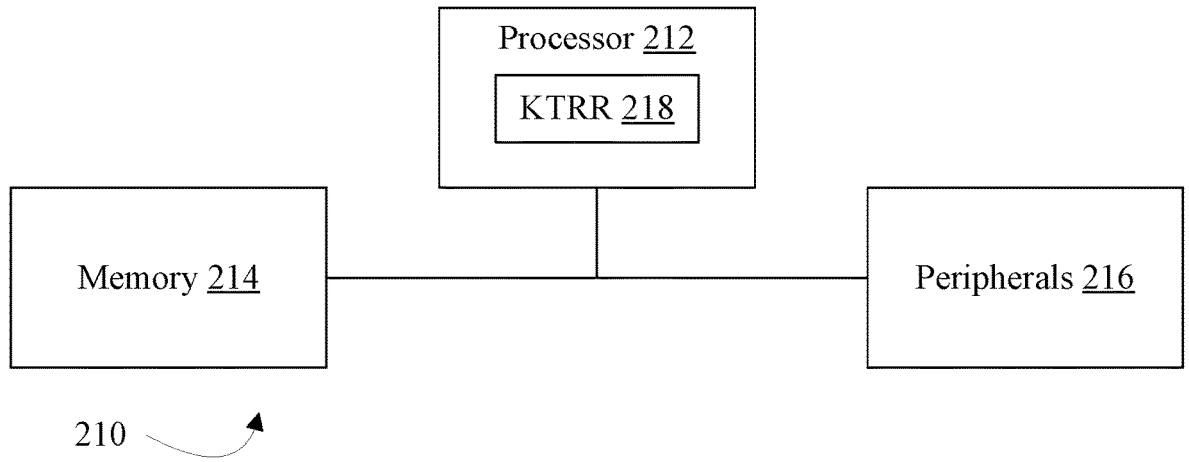
FIG. 4 is a block diagram of one embodiment of a system.

The secure ROM 10, the non-volatile memory 12, and the working memory 14 may be included in a system such as the system shown in FIG. 4. The secure ROM 10, for example, may be included in a secure element in the system (e.g. a trusted platform module, a secure enclave, etc.). Generally, a secure element may be an element in a system that is protected from access by other elements in the system and provides security in the system. For example, the secure element may authenticate code in the system before the code is permitted to execute, to avoid executing code that has been nefariously tampered with. Alternatively, the secure ROM 10 may be accessible to the main processors in the system (e.g. the central processing unit (CPU) processors in the system) so that the main processors may execute the boot code 16.

The boot code 16 may be executed during boot of the system. The boot of the system may occur when the system is powered on from a powered off state. The boot may identify the configuration of the system (e.g. locating optional hardware in the system or identifying one of several supported hardware components that may be used as a given component in the system). The boot may also include initializing various hardware components in the system to an expected state when power on occurs. Booting from a fully powered off state may be referred to as a cold boot.

A portion or all of the boot may occur when the system is powered to normal operating mode from a suspended mode or other low power mode. In this case, some of the system may already be initialized and/or may have state stored in the system at the time the system was placed in the low power state. It may be desirable to retain that state in the boot, and initialization of such hardware may be skipped in the boot from a low power mode. Booting from low power mode may be referred to as warm boot.

During cold boot, the boot code 16 may load the kernel image 18 into the working memory 14. Additionally, the boot code 16 may load the trust cache 24 into the working memory 14, as well as any secondary trust caches 26 that may be desired as discussed in more detail below for an embodiment.

The CPUs in the system may include a kernel text region register (KTRR) that is defined to protect a region 30 of the working memory 14. The access permissions for the region may be programmable in the register and may generally permit different restrictions for code executing at different privilege levels. Low privilege levels such as user-level may have no access at all to the KTRR-protected region 30. Higher privilege levels may be permitted read access but not write access. The highest privilege level may have write access, in some embodiments. In other embodiments, even the highest privilege level may not have write access during normal operation. That is, the KTRR may be programmed for read-only access even at the highest privilege level. The KTRR contents would need to be modified to allow a change in the KTRR-protected region 30.

The boot code 16 may program the KTRR to protect a region of memory including the trust cache 24, the secondary trust caches 26, if any, and the kernel image 18. The kernel image 18 includes trusted code segments 20A-20M, which form the kernel. In an embodiment, the trusted code segments 20A-20M are not covered by the trust cache 24. Since the trusted code segments 20A-20M are in the kernel itself, the trust may not need to be verified. In other embodiments, the trusted code segments 20A-20M may be covered by the trust cache 24.

The trusted code segments 22A-22N may be in user space in the working memory 14. That is, the trusted code segments 22A-22N may not be protected by the KTRR region 30 and may be accessible to user level code executing in the system. In various embodiments, the trusted code segments 22A-22N may include portions of the operating system that execute at user level. The trusted code segments 22A-22N may include code segments that control certain hardware components in the system (e.g. "device driver" code) in some embodiments. The trusted code segments 22A-22N may also include, in some embodiments, non-operating system code (e.g. "application code" or "apps"). The application code may be included in the system along with the kernel code and may be supplied by a trusted source.

Because the trusted code segments 22A-22N are in user space, the trusted code segments 22A-22N may be subject to modification (particularly by nefarious third parties). Accordingly, the trusted code segments 22A-22N may be covered by the trust cache 24. When a given trusted code segment 22A-22N is launched, the hash function implemented by the kernel may be performed on the given trusted code segment 22A-22N. The hash may be compared to the corresponding hash stored in the trust cache 24 to ensure that the given trusted code segment 22A-22N has not been modified. If the hashes match, the given trusted code segment 22A-22N may be launched. The hash may be generated and compared at other times as well (e.g. when the trusted code segment 22A-22N is called by the kernel or other portion of the operating system).

The working memory 14 may also store various other code segments, such as the untrusted code segments 28A-28P. The untrusted code segments 28A-28P may include code segments from unverified sources or may be code segments that were stored on the system after the kernel and trusted code segments 22A-22N were installed in the system. The source may be untrusted, or the code segments themselves have not been verified as safe even if received from a trusted source. Untrusted code segments 28A-28P may not be permitted as much access to the system and may rely on the operating system for certain services/hardware component operations.

Accordingly, the trust cache 24 stores hashes for trusted code segments 22A-22N, or at least a portion of the trusted code segments 22A-22N. The trust cache 24 may store hashes for trusted code segments 20A-20M, or a portion thereof, as well in some embodiments. That is, the trust cache 24 may have an entry for each trusted code segment covered by the cache, which stores the hash for the code segment. In one embodiment, a hash calculated from a trusted code segment may be compared to the hashes in the trust cache. If a match is found, the trusted code segment is validated as trusted and may execute as trusted. In an embodiment, one or more entries may be augmented with additional metadata that may further validate a trusted code segment (e.g. the source of the hash, data that is unique to a given code segment such as the address of the code segments in the non-volatile memory 12, a path name in the file system implemented on the non-volatile memory 12, a name of the code segment in the file system, etc.). In other embodiments, the existence of the matching hash in the trust cache 24 is considered sufficient to trust the code segment.

The trust cache 24 may be created when the system including the non-volatile memory 12, the ROM 10, and the working memory 14 is built and configured. Thus, different versions of the system with different hardware devices and/or configurations may be supported with the same kernel image 18. The trusted code segments 22A-22N that are included in the system may be signed and then the hash function may be applied to the signed trusted code segments 22A-22N to generate the hashes for storage in the trust cache 24. Other trusted code segments that may be included in a different version of the system, but which are not included in the present version may not be represented in the trust cache 24. That is, the trust cache 24 may be "personalized" for each system. The trust cache 24 may be downloaded to the non-volatile memory 12 and stored. In some embodiments, the trust cache 24 may be modified if additional trusted code segments are added to the system, in a similar fashion the to the above discussion. Additionally, during upgrades of the operating system on the system including the ROM 10, the non-volatile memory 12, and the working memory 14, the trusted code segments 22A-22N that are being changed may again have hashes generated and an updated trust cache 24 may be downloaded to the non-volatile memory 12. The secondary trust caches 26 may be generated and downloaded to the non-volatile memory 12 in a similar fashion.

In one embodiment, one or more secondary trust caches 26 may be included in the system (e.g. on the non-volatile memory 12) and may be selectively included in the KTRR-protected region 30 by the boot code 16 during boot. The secondary trust caches 26 may be used in certain system modes, in an embodiment. For example, if the system is being debugged, there may be trusted code segments forming the debugger. The debugger code segments may not normally be loaded at boot, but rather may be loaded if the system is being booted in a debug mode. Similarly, if a system is being booted in a diagnostic mode (e.g. a repair facility), diagnostic code segments may be loaded at boot. Any such trusted code segments which are loaded in a mode-dependent or otherwise conditional fashion may be covered by the secondary trust caches 26, and the secondary trust caches 26 may be conditionally loaded as well. In an embodiment, the secondary trust caches 26 may be concatenated with the trust cache 24 to form one contiguous trust cache of hashes.

In one embodiment, the trust caches 24 (and 26, if included) may be stored at memory addresses at the base of the KTRR-protected region 30 (that is, at numerically lower addresses than the kernel image 18). Such a configuration may permit the kernel to be loaded in the same portion of the region 30 each time, and the caches may "grow downward" in memory depending on the mode in which the system is booted. In other embodiments, the caches may be located anywhere within the region 30, as desired.

The privilege level may be a processor hardware mechanism that controls how much of the processor state is accessible to and/or manipulatable by the code executing at that privilege level. The lowest privilege level may be the "user" level. Non-operating system code may execute at the user level. In some embodiments, some operating system code may execute at the user level as well. Sensitive processor state such as the KTRR, the registers that define where virtual memory translation data is stored, configuration/mode registers in the processor, etc. is often not accessible at all to user level code. That is, the user level code may not read the contents of the registers and may not be permitted to update the registers. There may be one or more intermediate levels of privilege which have more access to the sensitive state, in some embodiments. The highest level of privilege may be full access level, and at least a portion of the kernel may execute at the highest level. The highest privilege level may sometimes be referred to as "supervisor" level. There may be one or more additional privilege levels between the user level and the highest level, with increasing amounts of privilege.

The working memory 14 may be the memory from which the CPUs and potentially other processors in the system execute code during normal operation and the memory that stores data for manipulation by the processors and/or other hardware components in the system. The working memory 14 (also referred to as "system memory") may be volatile but may have lower latency access than the non-volatile memory 12, higher bandwidth than the non-volatile memory 12, and/or lower power access than the non-volatile memory 12. For example, the working memory 12 may include RAM such as various forms of dynamic RAM (DRAM) including double data rate (DDR, DDR2, DDR3, DDR4, DDR5, etc.) DRAM or any other DRAM. DRAM may be manufactured to a DRAM standard so that memory devices from multiple vendors may be compatible. The working memory 14 may further include a memory controller for the DRAM that interfaces to the DRAM on behalf of the other hardware components in the system.

The non-volatile memory 12 may be any type of non-volatile memory. Generally, a non-volatile memory may be a memory which retains stored data even when the non-volatile memory is powered down. For example, the non-volatile memory may be Flash memory, magnetic memory such as a hard disk drive, optical memory such as digital video disk (DVD) or compact disk (DVD) memory.

A code segment may be any section of executable instructions that can be grouped and treated as a unit. Thus, a code segment may be a thread of a multi-threaded process, a process, a page of code in a virtual memory system, an application program ("app"), a function or subroutine, a method in an object-oriented system, etc. The hash may be computed by applying a hash function to the bytes forming the instructions, and any hash function may be used. In an embodiment, a code segment may also include one or more data segments for data manipulated by the code segment. The hash function may be applied to the bytes in the data segment(s) as well as the bytes forming the instructions.

Figure 2:
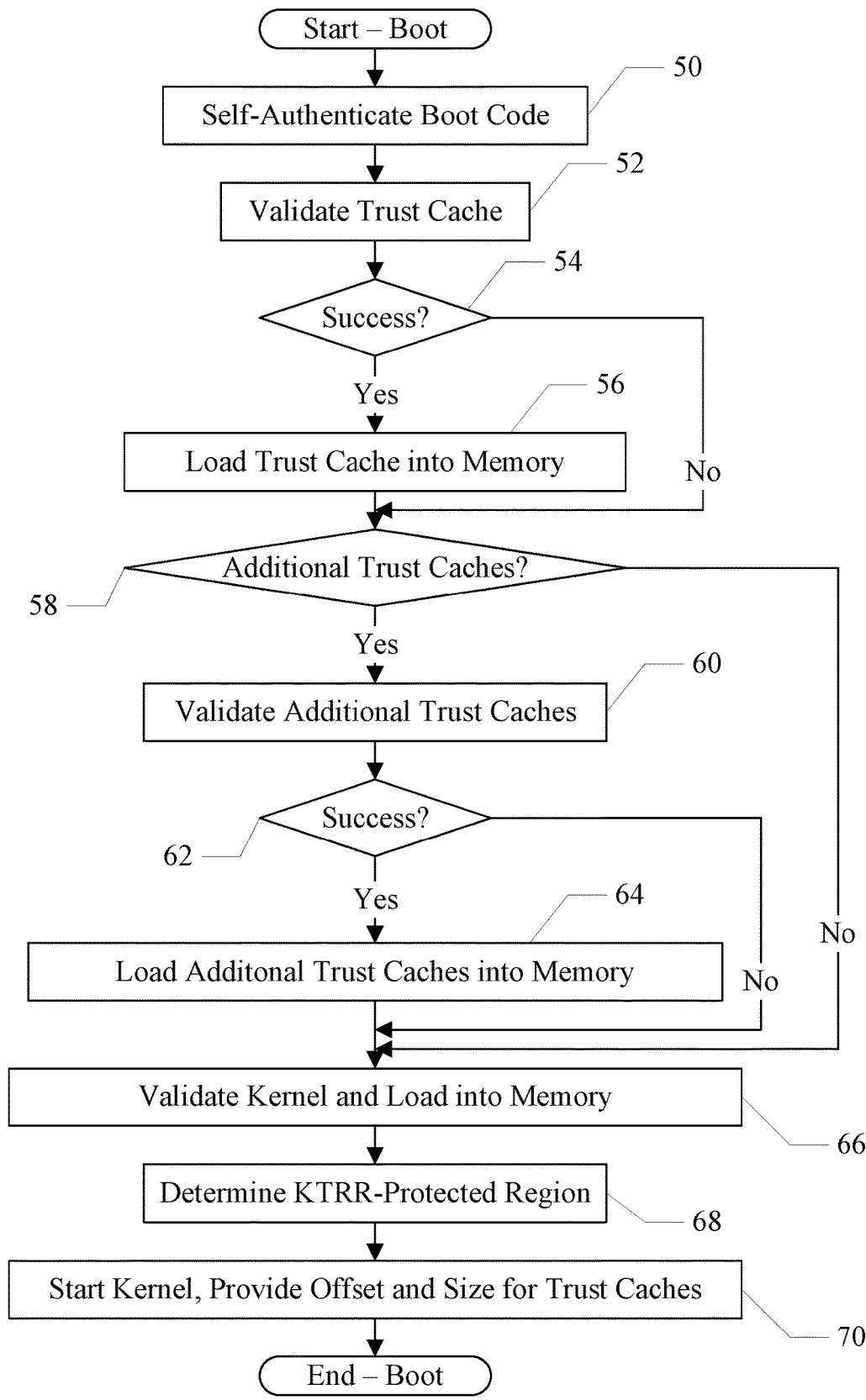
FIG. 2 is a flowchart illustrating operation of one embodiment of a system including the components shown in FIG. 1 during boot.

Turning now to FIG. 2, a flowchart is shown illustrating operation of one embodiment of the boot code 16 when executed in a system. While the blocks are shown in a particular order for ease of understanding, other orders may be used. The boot code 16 may include instructions which, when executed, implement the operation shown in FIG. 2.

The boot code 16 may self-authenticate to ensure that the boot code itself has not been changed (block 50). Any mechanism for authenticating may be used. The boot code 16 may also validate the trust cache 24 (block 52). For example, another hash may be computed over the contents of the trust cache 24 to ensure that it has not been changed. If the trust cache 24 is successful validated (decision block 54, "yes" leg), the boot code 16 may load the trust cache 24 into memory below the region where the kernel will be loaded (block 56). Alternatively, the kernel image 18 may be loaded first and then the trust cache 24 may be loaded below the kernel image 18 (i.e. at numerically lower addresses in the working memory 14). If the trust cache 24 is not successfully validated (decision block 54, "no" leg), the boot code 16 may skip loading the trust cache 24. In such cases, the trusted code segments which are covered by the trust cache 24 may be treated as untrusted code, or the boot may terminate with an error indicated that the trust cache 24 is not valid.

If one or more secondary trust caches 26 are to be loaded (decision block 58, "yes" leg), the boot code 16 may similarly validate the secondary trust caches 26 (block 60) and, if successfully validated (decision block 62), the secondary trust caches 26 may be loaded in the working memory 14 (block 64). The boot code 16 may validate the kernel image 18 and load the kernel image 18 into memory as well (assuming the kernel image is successfully validated) (block 66).

The boot code 16 may determine the KTRR-protected region 30, ensuring that both the kernel image 18, the trust cache 24, and the secondary trust caches 26 (if any) are encompassed by the region 30 (block 68). The boot code 16 may program the KTRR register with the data describing the region (e.g. a base address and extent) along with the protection configuration. The boot code 16 may then start the kernel, passing the kernel the offset within the KTRR-protected region 30 to the trust cache(s) and the size of the trust cache(s) (block 70).

Figure 3:
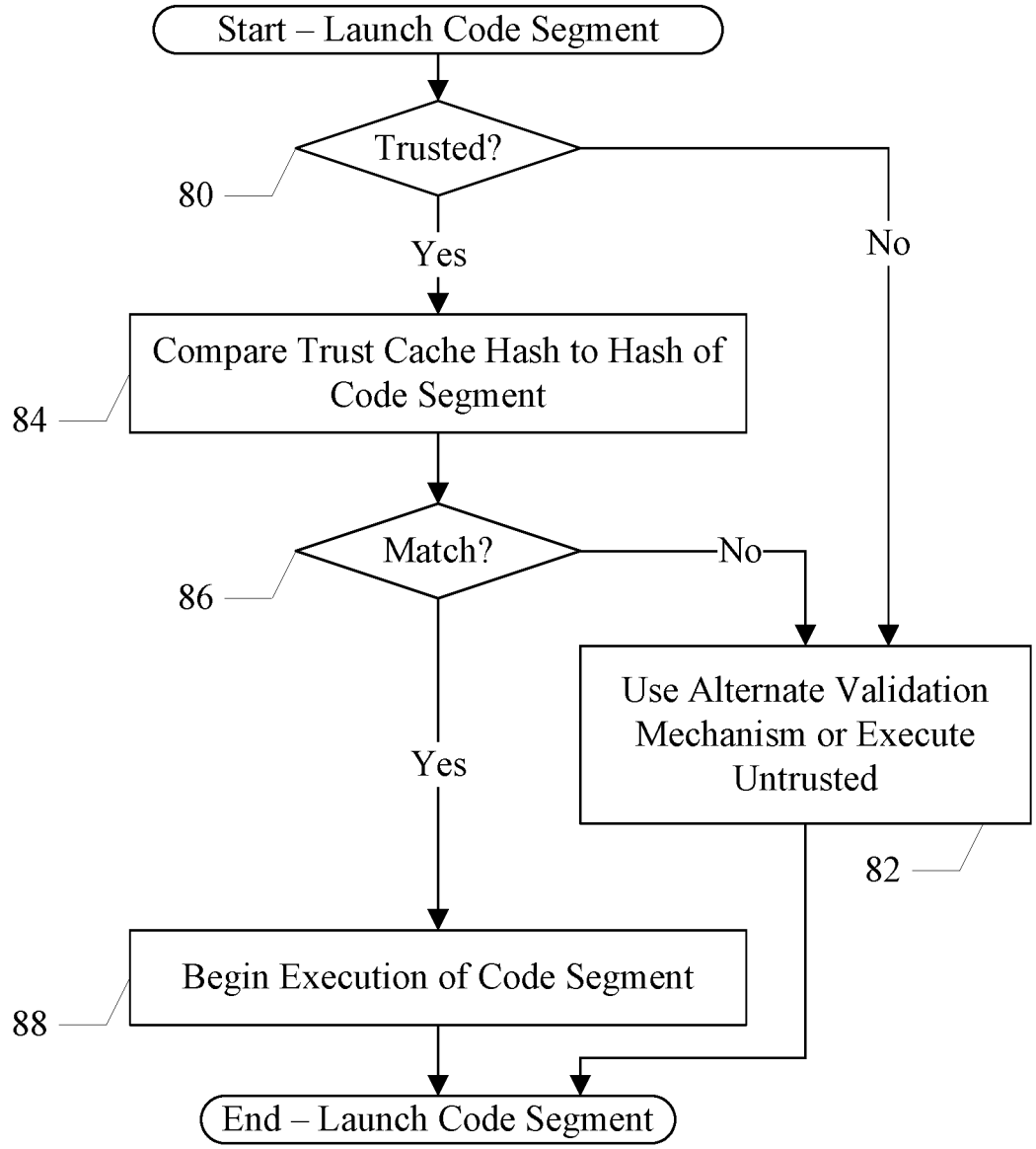
FIG. 3 is a flowchart illustrating operation of one embodiment of a system including the components shown in FIG. 1 to launch a code segment.

FIG. 3 is a flowchart illustrating operation of one embodiment of the kernel when a code segment is launched for execution. While the blocks are shown in a particular order for ease of understanding, other orders may be used. The kernel may include instructions which, when executed, implement the operation shown in FIG. 3.

If the code segment is not trusted (decision block 80, "no" leg), a mechanism other than the trust cache 24 may be used to validate the code segment or the code segment may be executed untrusted (block 82). For example, the code segment may be signed with a certificate, and the signature may be validated using the cryptographic signature procedure. If the code segment is trusted (decision block 80, "yes" leg), the kernel may compute a hash over the code segment and compare the trust cache hash for the code segment to the computed has (block 84). If the hashes do not match (decision block 86, "no" leg), the kernel may use an alternative validation mechanism, execute the code segment untrusted, or stop execution with an error (block 82). If the hashes match (decision block 86, "yes" leg), the kernel may initiate execution of the code segment (block 88).

Turning now to FIG. 4, a block diagram of one embodiment of an exemplary computer system 210 is shown. In the embodiment of FIG. 4, the computer system 210 includes at least one processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor. The processor 212 may be the CPU (or CPUs, if more than one processor is included) in the system 210. The processor 212 may be a multi-core processor, in some embodiments.

As illustrated in FIG. 4, the processor 212 may include the KTRR register 218. The KTRR register 218 may be programmed to define the KTRR region 30. When multiple processors 212 are included, the KTRR register 218 may be shared. Alternatively, one or more processors may have separate copies of the KTRR register 218. In an embodiment, a hardware mechanism may ensure that the copies are synchronized (i.e. that they contain the same value at a given point in time).

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridges may be used to couple the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc. The memory 214 may include the working memory 14 and/or the secure ROM 10, in an embodiment.

Figure 5:
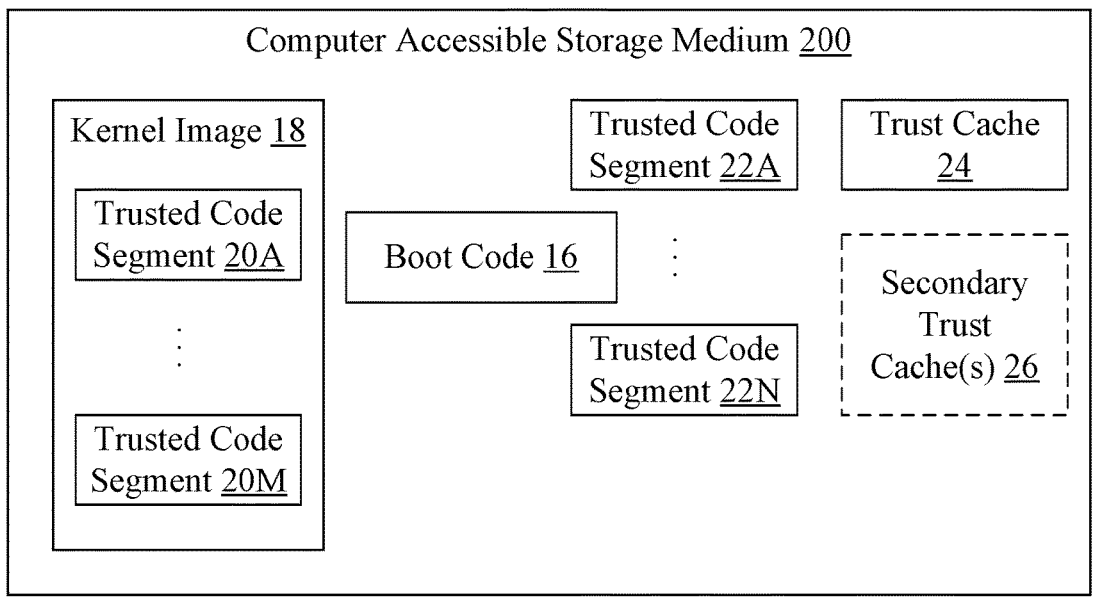
FIG. 5 is a block diagram of one embodiment of a computer accessible storage medium.

Peripheral devices 216 may represent any sort of hardware devices that may be included in the computer system 210 or coupled thereto (e.g. storage devices, optionally including a computer accessible storage medium 200 such as the one shown in FIG. 5), other input/output (I/O) devices such as video hardware, audio hardware, user interface devices, networking hardware, various sensors, etc.). Peripheral devices 216 may further include various peripheral interfaces and/or bridges to various peripheral interfaces such as peripheral component interconnect (PCI), PCI Express (PCIe), universal serial bus (USB), etc. The interfaces may be industry-standard interfaces and/or proprietary interfaces. In some embodiments, the processor 212, the memory controller for the memory 214, and one or more of the peripheral devices and/or interfaces may be integrated into an integrated circuit (e.g. a system on a chip (SOC)). The peripheral devices 216 may include the non-volatile memory 12, in an embodiment.

The computer system 210 may be any sort of computer system, including general purpose computer systems such as desktops, laptops, servers, etc. The computer system 210 may be a portable system such as a smart phone, personal digital assistant, tablet, etc.

FIG. 5 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 5 may store code forming the kernel image 18, including the trusted code segments 20A-20M, boot code 16, and/or the trusted code segments 22A-22N, etc. The computer accessible storage medium 200 may still further store one or more data structures such as the trust cache 24 and/or the secondary trust caches 26. The kernel, the boot code 16, and the trusted code segments 22A-22N may comprise instructions which, when executed, implement the operation described above.

Numerous variations and modifications will become apparent to those skilled in the art once the above disclosure is fully appreciated. It is intended that the following claims be interpreted to embrace all such variations and modifications.

What is claimed is:

1. A computer system comprising:
 a processor;
 a memory coupled to the processor;
 a non-volatile memory coupled to the processor, wherein the non-volatile memory stores:
  a kernel image, wherein the kernel image includes a plurality of instructions forming one or more code segments that, when executed on the processor, implement an operating system kernel on the computer system; and
  a trust cache separate from the kernel image, wherein the trust cache includes a plurality of hashes corresponding to a plurality of trusted code segments that are executable on the processor and are trusted by the operating system kernel, wherein the operating system kernel is configured to compute a first hash of a first trusted code segment of the plurality of trusted code segments in a first mode and is configured to determine whether or not to execute the first trusted code segment as trusted code on the computer system in the first mode based on a comparison of the first hash and the plurality of hashes in the trust cache; and a read-only memory (ROM) storing a boot code, wherein the boot code, when executed by the processor, causes the processor to:
load the kernel image into the memory; and
load the trust cache into the memory.

2. The computer system as recited in claim 1 wherein the boot code, when executed on the processor, causes the processor to:
define a region of memory that encompasses the trust cache and the kernel image; and
program a processor register that restricts access to the region.

3. The computer system as recited in claim 1 wherein the non-volatile memory further stores one or more secondary trust caches separate from the kernel image, wherein the secondary trust caches include a second plurality of hashes corresponding to a second plurality of trusted code segments that are executable on the processor and are trusted by the operating system kernel.

4. The computer system as recited in claim 3 wherein the boot code, when executed on the processor, causes the processor to:
determine whether or not the computer system is booting in a second mode different from the first mode;
load at least one of the one or more secondary trust caches into the memory in response to determining that the computer system is booting in the second mode; and
inhibit loading the at least one of the one or more secondary trust caches in response to determining that the computer system is booting in the first mode.

5. The computer system as recited in claim 4 wherein the second mode is a debug mode.

6. The computer system as recited in claim 4 wherein the second mode is a diagnostic mode.

7. The computer system as recited in claim 4 wherein the at least one of the one or more secondary trust caches are loaded into the memory adjacent to the trust cache.

8. The computer system as recited in claim 1 wherein the plurality of trusted code segments are executed at user privilege level.

9. A non-transitory computer accessible storage medium storing:
a kernel image, wherein the kernel image includes a plurality of instructions forming one or more code segments that, when executed on a computer, implement an operating system kernel on the computer; and
a trust cache separate from the kernel image, wherein the trust cache includes a plurality of hashes corresponding to a plurality of trusted code segments that are executable on the computer and are trusted by the operating system kernel, wherein the operating system kernel is configured to compute a first hash of a first trusted code segment of the plurality of trusted code segments in a first mode and is configured to determine whether or not to execute the first trusted code segment as trusted code on the computer in the first mode based on a comparison of the first hash and the plurality of hashes in the trust cache.

10. The non-transitory computer accessible storage medium as recited in claim 9 further storing the plurality of trusted code segments.

11. The non-transitory computer accessible storage medium as recited in claim 10 further storing a boot code that, when executed on the computer, causes the computer to:
load the kernel image into a memory in the computer; and
load the trust cache into the memory.

12. The non-transitory computer accessible storage medium as recited in claim 11 wherein the boot code, when executed on the computer, causes the computer to:
define a region of memory that encompasses the trust cache and the kernel image; and
program a processor register that restricts access to the region.

13. The non-transitory computer accessible storage medium as recited in claim 9 wherein the operating system kernel, when executed on the computer, causes the computer to:
execute the first trusted code segment responsive to a match between the first hash and one of the plurality of hashes in the trust cache.

14. The non-transitory computer accessible storage medium as recited in claim 9 wherein the operating system kernel, when executed on the computer, causes the computer to:
prevent execution of the first trusted code segment responsive to a mismatch between the first hash and one of the plurality of hashes in the trust cache.

15. The non-transitory computer accessible storage medium as recited in claim 9 wherein the operating system kernel, when executed on the computer, causes the computer to:
execute the first trusted code segment in an untrusted fashion responsive to a mismatch between the first hash and one of the plurality of hashes in the trust cache.

16. The non-transitory computer accessible storage medium as recited in claim 9 wherein the operating system kernel, when executed on the computer, causes the computer to:
use an alternate mechanism to validate the first trusted code segment responsive to a mismatch between the first hash and one of the plurality of hashes in the trust cache.

17. The non-transitory computer accessible storage medium as recited in claim 9 further storing one or more secondary trust caches, wherein the one or more secondary trust caches are separate from the kernel image, and wherein the one or more secondary trust caches include a second plurality of hashes corresponding to a second plurality of trusted code segments that are executable on the computer and are trusted by the operating system kernel, wherein the one or more secondary trust caches are selectively loaded into a memory during boot of the computer.

18. A non-transitory computer accessible storage medium storing a plurality of instructions which, when executed on a computer, causes the computer to:
load a kernel image into a memory in the computer from a non-volatile memory during a boot of the computer, wherein the kernel image includes a plurality of instructions forming one or more code segments that, when executed on the computer, implement an operating system kernel on the computer; and load a trust cache into the memory from the non-volatile memory, wherein the trust cache is separate from the kernel image on the non-volatile memory, and wherein the trust cache includes a plurality of hashes corresponding to a plurality of trusted code segments that are executable on the computer and are trusted by the operating system kernel, wherein the operating system kernel is configured to compute a first hash of a first trusted code segment of the plurality of trusted code segments in a first mode and is configured to determine whether or not to execute the first trusted code segment as trusted code on the computer in the first mode based on a comparison of the first hash and the plurality of hashes in the trust cache.

19. The non-transitory computer accessible storage medium as recited in claim 18 wherein the plurality of instructions, when executed on the computer, causes the computer to:

define a region of memory that encompasses the trust cache and the kernel image; and program a processor register that restricts access to the region.

20. The non-transitory computer accessible storage medium as recited in claim 18 further storing one or more secondary trust caches separate from the kernel image, wherein the secondary trust caches include a second plurality of hashes corresponding to a second plurality of trusted code segments that are executable on the computer and are trusted by the operating system kernel, and the plurality of instructions, when executed, causes the computer to:

determine whether or not the computer is booting in a second mode different from the first mode;

load at least one of the one or more secondary trust caches into the memory in response to determining that the computer is booting in the second mode; and inhibit loading the at least one of the one or more secondary trust caches in response to determining that the computer is booting in the first mode.

\* \* \* \* \*